(12) United States Patent
Kuan et al.

(10) Patent No.: US 9,223,394 B2
(45) Date of Patent: *Dec. 29, 2015

(54) RACK AND POWER CONTROL METHOD THEREOF

(71) Applicants: INVENTEC (PUDONG) TECHNOLOGY CORPORATION, Shanghai (CN); INVENTEC CORPORATION, Taipei (TW)

(72) Inventors: Hao-Yen Kuan, Taipei (TW); Shu-Yen Wang, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 344 days.

This patent is subject to a terminal disclaimer.

(21) Appl. No.: 13/830,051

(22) Filed: Mar. 14, 2013

(65) Prior Publication Data

US 2014/0136866 A1    May 15, 2014

(30) Foreign Application Priority Data

Nov. 15, 2012   (CN) .......................... 2012 1 0460312

(51) Int. Cl.
*G06F 1/26* (2006.01)
*G06F 1/32* (2006.01)
*G06F 11/20* (2006.01)
*G06F 1/30* (2006.01)

(52) U.S. Cl.
CPC ................ *G06F 1/3296* (2013.01); *G06F 1/26* (2013.01); *G06F 1/263* (2013.01); *G06F 1/30* (2013.01); *G06F 1/3203* (2013.01); *G06F 11/2015* (2013.01); *Y02B 60/1285* (2013.01)

(58) Field of Classification Search
CPC ............. G06F 1/26; G06F 1/263; G06F 1/30; G06F 1/3203; G06F 11/2015
USPC .................. 713/300, 320, 321, 322, 323, 324
See application file for complete search history.

(56) References Cited

U.S. PATENT DOCUMENTS

2011/0320849 A1*  12/2011  Cochran et al. ............... 713/340
2012/0136498 A1*   5/2012  Chen et al. .................... 700/297

* cited by examiner

*Primary Examiner* — Michael J Brown
(74) *Attorney, Agent, or Firm* — Huffman Law Group, PC

(57) ABSTRACT

A power control method of a rack having a plurality of nodes includes the following steps. Power information of each node is received. A total power consumption value of the plurality of nodes according to the power information is calculated. A number of power supply units to be turned on according to the total power consumption value and a maximum supplied power value of a single power supply unit is calculated. At least one primary power supply unit and at least one secondary power supply unit in pairs according to the number of power supply units to be turned on is started. The at least one primary power supply unit provides a duty voltage to the plurality of nodes, and the at least one secondary power supply unit does not provide the duty voltage to the plurality of nodes.

19 Claims, 3 Drawing Sheets

RACK AND POWER CONTROL METHOD THEREOF

CROSS-REFERENCE TO RELATED APPLICATIONS

This non-provisional application claims priority under 35 U.S.C. §119(a) on Patent Application No(s). 201210460312.1 filed in China on Nov. 15, 2012, the entire contents of which are hereby incorporated by reference.

BACKGROUND OF THE INVENTION

1. Field of the Invention

The disclosure relates to a power control method, and more particularly to a rack and a power control method thereof.

2. Description of the Related Art

Generally speaking, performance and efficacy of individual servers are emphasized nowadays. Based on this concept, servers are designed in consideration of division of work and independent operation. That is to say, each server node dynamically adjusts its energy consumption according to its state and in consideration of tradeoffs between energy saving and performance.

However, under this concept, the server nodes are limited to division of work, and cannot cooperate with each other, which often results in the scenario that all the server nodes in a data center simultaneously operate in almost the same performance state, resulting in excessive power consumption. In addition, when a server operates normally, all power supply units in the server are intitiated to provide a power supply voltage required by the corresponding server nodes of the server. However, during actual operation of the server, since the server nodes are not always in a full-load state, excessive power consumption is caused. Therefore, it is necessary to effectively reduce the power consumption of a server.

BRIEF SUMMARY OF THE INVENTION

An embodiment of the disclosure provides a power control method of a rack. The rack has a plurality of nodes. The power control method of the rack comprises the following steps. Power information of each of the plurality of nodes is received. A total power consumption value of the plurality of nodes according to the power information is calculated. A number of power supply units to be turned on according to the total power consumption value and a maximum supplied power value of a single power supply unit is calculated. At least one primary power supply unit and at least one secondary power supply unit in pairs according to the number of power supply units to be turned on are started, so that the at least one primary power supply unit provides a duty voltage to the plurality of nodes, and the at least one secondary power supply unit does not provide the duty voltage to the plurality of nodes. An input source of at least one primary power supply unit and an input source of the at least one secondary power supply unit are different.

Another embodiment of the disclosure provides a rack comprising a plurality of primary power supply units, a plurality of secondary power supply units, a plurality of nodes, a rack management controller (RMC), and a control unit. The plurality of primary power supply units are configured to respectively provide a duty voltage. The plurality of secondary power supply units are configured to respectively provide the duty voltage. The primary power supply units and the secondary power supply units receive different input sources. The plurality of nodes are configured to respectively provide power information. The RMC, coupled to the plurality of nodes, is configured to receive the power information, to calculate a total power consumption value of the plurality of nodes according to the power information, and to calculate a number of power supply units to be turned on according to the total power consumption value and a maximum supplied power value of a single power supply unit. The control unit, coupled to the RMC, the primary power supply units, and the secondary power supply units, is configured to receive the number of power supply units to be turned on and generate a plurality of control signals according to the number of power supply units to be turned on, so as to start at least one of the primary power supply units and at least one of the secondary power supply units in pairs. Therefore, the at least one of the primary power supply units provides the duty voltage to the plurality of nodes, and the at least one of the secondary power supply units does not supply the duty voltage to the plurality of nodes.

Yet another embodiment of the disclosure comprises a rack, comprising a rack management controller (RMC) and a control unit. The rack management controller is coupled to a plurality of nodes and is configured to receive power information therefrom, to calculate a total power consumption value of the plurality of nodes according to the power information, and to calculate a number of power supply units to be turned on according to the total power consumption value and a maximum supplied power value of a single power supply unit. The control unit is coupled to the RMC, the primary power supply units and the secondary power supply units. The control unit is configured to receive the number of power supply units to be turned on and to generate a plurality of control signals according to the number of power supply units to be turned on.

BRIEF DESCRIPTION OF THE DRAWINGS

The disclosure will become more fully understood from the detailed description given herein below for illustration only, thus not limiting the disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
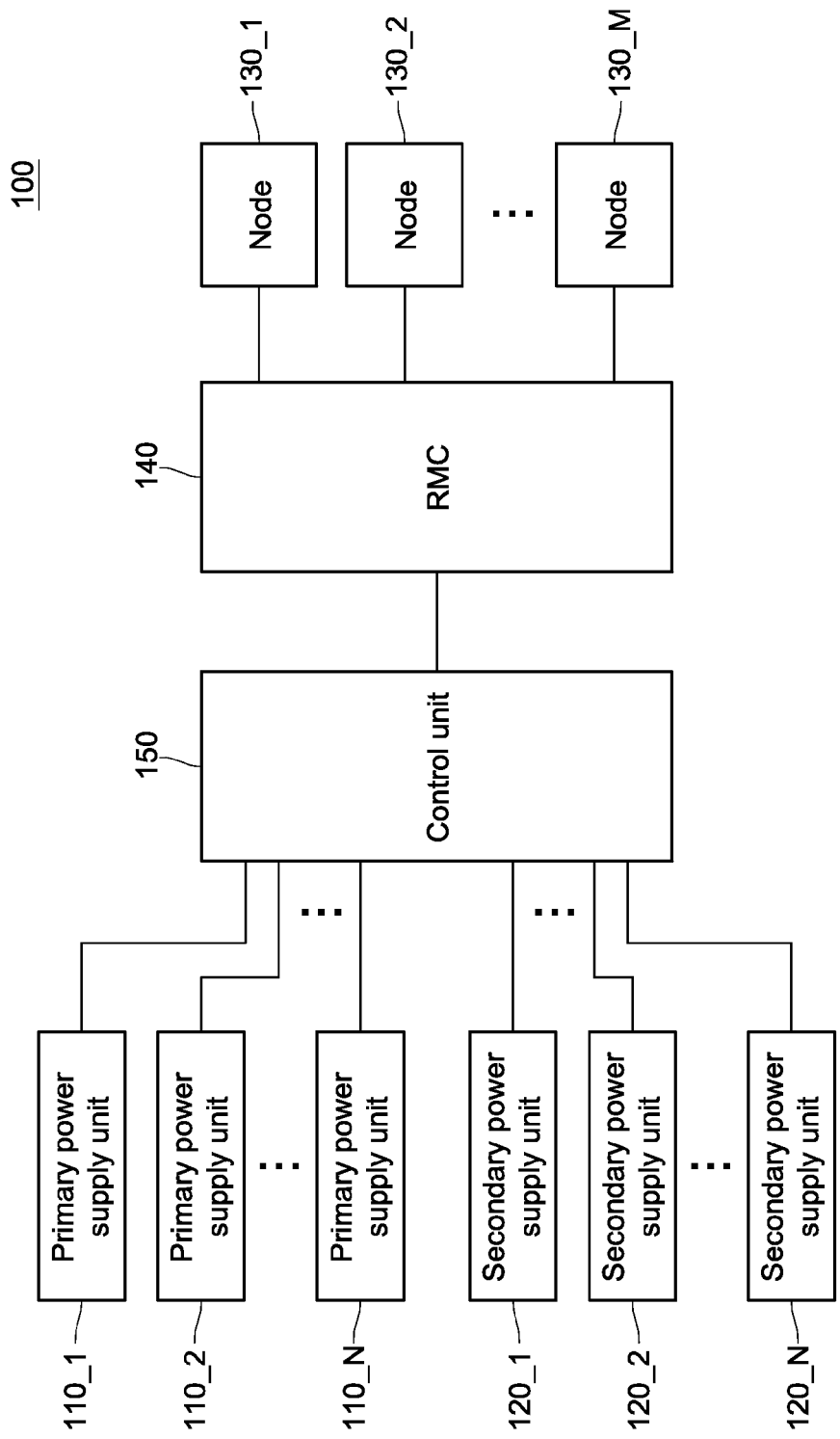
FIG. 1 is a schematic view of a rack according to an embodiment of the disclosure.

FIG. 1 is a schematic view of a rack according to an embodiment of the disclosure. The rack 100 comprises a plurality of primary power supply units 110_1~110_N, a plurality of secondary power supply units 120_1~120_N, a plurality of nodes 130_1~130_M, an RMC 140, and a control unit 150. In this disclosure, N and M are positive integers greater than 1, and N and M may be the same or different.

The primary power supply units 110_1~110_N are configured to respectively provide a duty voltage. That is to say, when the primary power supply units 110_1~110_N are in a normal state, they are, for example, configured to provide a primary duty voltage for the rack 100.

The secondary power supply units 120_1~120_N are configured to respectively provide a duty voltage. That is to say, when the secondary power supply units 120_1~120_N are in a normal state, they are, for example, configured to provide a secondary duty voltage for the rack 100. That is, when a malfunction occurs at all of the primary power supply units 110_1~110_N, the secondary power supply units 120_1~120_N provide the duty voltage for the rack 100, so that the rack 100 can still operate normally.

In this embodiment, the primary power supply units 110_1~110_N and the secondary power supply units 120_1~120_N can provide the same maximum supplied power value, which is, for example, 500 Watts (W). In addition, an input source of the primary power supply units 110_1~110_N and an input source of the secondary power supply units 120_1~120_N are different. For example, the input source of the primary power supply units 110_1~110_N is, for example, mains (i.e., supply mains or commercial power), and the input source of the secondary power supply units 120_1~120_N is, for example, a battery or other energy storage elements.

The plurality of nodes 130_1~130_M are configured to respectively provide power information. Typically, each of the plurality of nodes 130_1~130_M comprises, for example, a baseboard management controller (BMC) and a connection interface. The BMCs are configured to detect operating states of the plurality of nodes 130_1~130_M so as to provide the power information of the plurality of nodes 130_1~130_M. The power information is, for example, voltages, currents, power consumptions, and the like of the plurality of nodes 130_1~130_M.

In this embodiment, the connection interface is, for example, an inter-integrated circuit (I2C) bus, a serial peripheral interface (SPI) bus, or a general purpose input output (GPIO) bus.

The RMC 140, coupled to the BMCs of the plurality of nodes 130_1~130_M through the connection interfaces, is configured to receive the power information (that is, voltages, currents, power consumptions, and the like of the plurality of nodes 130_1~130_M), and to calculate a total power consumption value of the plurality of nodes 130_1~130_M according to the power information.

Using this power information, the RMC 140 calculates a number of power supply units to be turned on according to the total power consumption value and the maximum supplied power value of a single power supply unit. The maximum supplied power value of a single power supply unit is, for example, 500 W. Typically, the number of power supply units to be turned on is, for example, obtained by dividing the total power consumption value by the maximum supplied power value of a single power supply unit.

In one embodiment, assuming that the total power consumption value is 1400 W and the maximum supplied power value of a single power supply unit is 500 W, the RMC 140 calculates the total power consumption value and the maximum supplied power value of a single power supply unit to obtain the result that 1400 W /500 W =2.8, that is, the number of power supply units to be turned on is 2.8. However, since it is impossible to start 0.8 power supply units, the RMC 140 takes less than 1 power supply unit as 1 power supply unit. Therefore, in this embodiment, the number of power supply units to be turned on is obtained by the RMC 140 is 3.

In another embodiment, assuming that the total power consumption value is 1600 W and the maximum supplied power value of a single power supply unit is 500 W, the RMC 140 calculates the total power consumption value and the maximum supplied power value of a single power supply unit to obtain 1600 W /500 W=3.2, that is, the number of power supply units to be turned on is 3.2. In this embodiment, the number of power supply units to be turned on is obtained by the RMC 140 is 4.

The control unit 150, coupled to the RMC 140, the primary power supply units 110_1~110_N, and the secondary power supply units 120_1~120_N, and is configured to receive the number of power supply units to be turned on, and to generate a plurality of control signals to start at least one primary power supply unit and at least one secondary power supply unit in pairs. In this embodiment, the control unit 150 is, for example, a complex programmable logic device (CPLD).

For example, considering that the number of power supply units to be turned on which is calculated by the RMC 140 is 3, thus the control unit 150, for example, generates and provides corresponding control signals to the primary power supply units 110_1~110_3 and the secondary power supply units 120_1~120_3, so as to start the primary power supply units 110_1~110_3 and the secondary power supply units 120_1~120_3.

That is to say, the control unit 150 starts power supply units in pairs. For example, when the number of power supply units to be turned on as determined by the RMC 140 is 1, the control unit 150 correspondingly starts the primary power supply unit 110_1 and the secondary power supply unit 120_1. When the number of power supply units to be turned on as determined by the RMC 140 is 2, the control unit 150 correspondingly starts the primary power supply units 110_1~110_2 and the secondary power supply units 120_1~120_2.

Typically, the control signals comprise, for example, a start signal DC_ON and a power supply signal DC_Rapidon. The start signal DC_ON is configured to control starting of a power supply unit. For example, when the start signal DC_ON is at a low logic level, it is used to start operation of a power supply unit. When the start signal DC_ON is at a high logic level, it is used to stop operation of a power supply unit.

The power supply signal DC_Rapidon is configured to control a supply of power from a power supply unit. For example, when the power supply signal DC_Rapidon is at a high logic level, it enables a power supply unit to provide a high voltage of for example 12.2 V, so that the plurality of nodes 130_1~130_M operate using the power supply unit providing the high voltage.

When the power supply signal DC_Rapidon is at a low logic level, it enables a power supply unit to provide a low voltage of for example 11.9 V, so that the plurality of nodes 130_1~130_M will not operate using the power supply unit providing the low voltage.

For example, when the number of power supply units to be turned on as determined by the RMC 140 is 1, the control unit 150 correspondingly generates and provides the start signal DC_ON at the low logic level and the power supply signal DC_Rapidon at the high logic level to the primary power supply unit 110_1, and the start signal DC_ON at the low logic level and the power supply signal DC_Rapidon at the low logic level to the secondary power supply unit 120_1, so as to start operation of the primary power supply unit 110_1 and the secondary power supply unit 120_1, so that the primary power supply unit 110_1 provides a high voltage, and the secondary power supply unit 120_1 provides a low voltage. Therefore, the plurality of nodes 130_1~130_M operate at the duty voltage provided by the primary power supply unit 110_1, and the secondary power supply unit 120_1 is standby. In other words, the secondary power supply units 120 are considered as backup power supply units.

In addition, the control unit 150 correspondingly generates and provides the start signal DC_ON at the high logic level to the primary power supply units 110_2~110_N and the secondary power supply units 120_2~120_N, so as to stop operation of the primary power supply units 110_2~110_N and the secondary power supply units 120_2~120_N. Thus, power saving can be achieved.

In another embodiment, when the number of power supply units to be turned on as determined by the RMC 140 is 2, the control unit 150 correspondingly generates and provides the start signal DC_ON at the low logic level and the power supply signal DC_Rapidon at the high logic level to the primary power supply units 110_1~110_2, and the start signal DC_ON at the low logic level and the power supply signal DC_Rapidon at the low logic level to the secondary power supply units 120_1~120_2, so as to start operation of the primary power supply units 110_1~110_2 and the secondary power supply units 120_1~120_2 so that the primary power supply units 110_1~110_2 provide a high voltage, and the secondary power supply units 120_1~120_2 provide a low voltage. Therefore, the plurality of nodes 130_1~130_M operate at the duty voltage provided by the primary power supply units 110_1~110_2, and the secondary power supply units 120_1~120_2 are standby.

In addition, the control unit 150 correspondingly generates and provides the start signal DC_ON at the high logic level to the primary power supply units 110_3~110_N and the secondary power supply units 120_3~120_N, so as to stop operation of the primary power supply units 110_3~110_N and the secondary power supply units 120_3~120_N. Thus, power saving can be achieved.

After being started, the primary power supply units 110_1~110_N and the secondary power supply units 120_1~120_N each transmit a power good signal to indicate whether the primary power supply units 110_1~110_N and the secondary power supply units 120_1~120_N are normal. Then, the power good signals may be transmitted to the control unit 150, so that the control unit 150 can determine according thereto whether the primary power supply units 110_1~110_N and the secondary power supply units 120_1~120_N are operating in the normal state.

For example, in this embodiment, when the power good signals are at the high logic level, it indicates that the primary power supply units 110_1~110_N and the secondary power supply units 120_1~120_N are in the normal state. When the power good signals are at the low logic level, it indicates that the primary power supply units 110_1~110_N and the secondary power supply units 120_1~120_N are not in the normal state.

Assuming that the primary power supply units 110_1~110_3 are started, when the power good signal received by the control unit 150 from the primary power supply unit 110_2 is at the low logic level, it indicates that a malfunction or a damage occurs at the primary power supply unit 110_2, and accordingly, the control unit 150 reports the abnormal state to the RMC 140 as well as generating and providing control signals (the start signal DC_ON at the low logic level and the power supply signal DC_Rapidon at the high logic level) to the primary power supply unit 110_4, so as to start the primary power supply unit 110_4.

However, after the control unit 150 generates and provides the control signals to the primary power supply unit 110_4, when the power good signal received by the control unit 150 from the primary power supply unit 110_4 is also at the low logic level, it indicates that a malfunction (namely, an anomaly) or a damage occurs at the primary power supply unit 110_4, and accordingly, the control unit 150 reports the abnormal state to the RMC 140 as well as generating and providing control signals (the start signal DC_ON at the low logic level and the power supply signal DC_Rapidon at the high logic level) to the primary power supply unit 110_5, so as to start the primary power supply unit 110_5.

In addition, when the control unit 150 determines that a malfunction occurs at one of the primary power supply units, the control unit 150 further determines whether the primary power supply unit where a malfunction occurs is the last one of the primary power supply units 110_1~110_N, that is, the primary power supply unit 110_N. When determining that the primary power supply unit where a malfunction occurs is not the last primary power supply unit 110_N, the control unit 150 correspondingly generates and provides control signals to start the next primary power supply unit.

When determining that the primary power supply unit where a malfunction occurs is the last primary power supply unit 110_N, the control unit 150 generates and provides the power supply signal DC_Rapidon at the high logic level to the secondary power supply unit 120_1, so as to switch the secondary power supply unit 120_1 from providing a low voltage to providing a high voltage, so that the rack 100 can still operate normally.

When a malfunction occurs at the input source of the primary power supply units 110_1~110_N (for example, a power outage occurs), the primary power supply units 110_1~110_N fail to receive power from the input source, and correspondingly generate the power good signals at the low logic level. Therefore, when the control unit 150 determines that all of the power good signals generated by the started primary power supply units 110_1~110_3 are at the low logic level, it indicates that a malfunction occurs at all of the primary power supply units 110_1~110_3, and accordingly, the control unit 150 generates and provides the power supply signal DC_Rapidon at the high logic level to a corresponding number of the secondary power supply units 120_1~120_3, so as to switch the secondary power supply units 120_1~120_3 from providing a low voltage to providing a high voltage as the power source required for operation of the plurality of nodes 130_1~130_M, so that the rack 100 can still operate normally. Thus, the problem that the rack 100 cannot operate when a malfunction occurs at the power supply unit can be solved.

In addition, when the control unit 150 determines that not all of the power good signals generated by the started primary power supply units are at the low logic level, reference may be made to the above operational example where a malfunction occurs at the primary power supply unit 110_2, and the details will not be described herein again.

Figure 2:
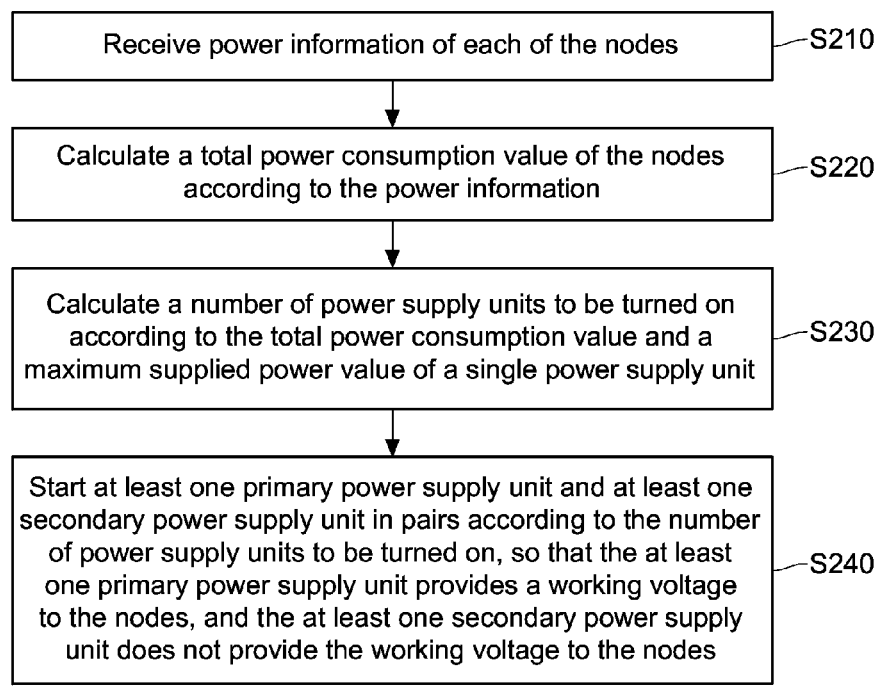
FIG. 2 is a flowchart of a power control method of a rack according to an embodiment of the disclosure.

A power control method of a rack can be derived from the description of the above embodiments. Please refer to FIG. 2, which is a flowchart of a power control method of a rack according to an embodiment of the disclosure. The rack of this embodiment has a plurality of nodes. In Step S210, power information of each of the plurality of nodes is received. In Step S220, a total power consumption value of the plurality of nodes is calculated according to the power information. In Step S230, a number of power supply units to be turned on is calculated according to the total power consumption value and a maximum supplied power value of a single power supply unit. In Step S240, at least one primary power supply unit and at least one secondary power supply unit are started in pairs according to the number of power supply units to be turned on, so that the at least one primary power supply unit provides a duty voltage to the plurality of nodes, and the at least one secondary power supply unit does not provide the duty voltage to the plurality of nodes.

Figure 3:
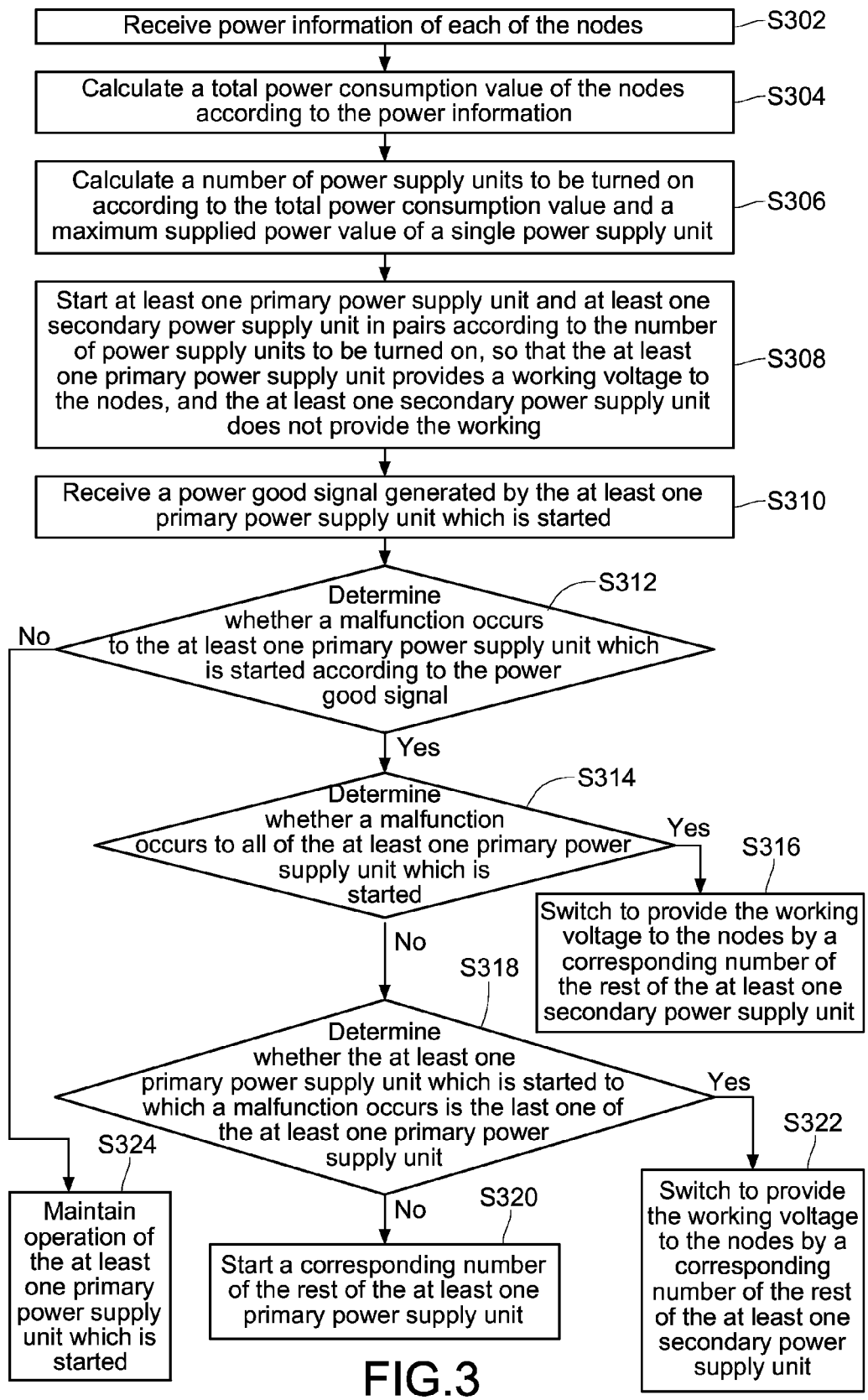
FIG. 3 is a flowchart of another power control method of a rack according to an embodiment of the disclosure.

Please refer to FIG. 3, which is a flowchart of a power control method of a rack according to an embodiment of the disclosure. The rack of this embodiment has a plurality of nodes. In Step S302, power information of each of the plurality of nodes is received. In Step S304, a total power consumption value of the plurality of nodes is calculated according to the power information. In Step S306, a number of power supply units to be turned on is calculated according to the total power consumption value and a maximum supplied power value of a single power supply unit. In Step S308, at least one primary power supply unit and at least one secondary power supply unit are started in pairs according to the number of power supply units to be turned on, so that the at least one primary power supply unit provides a duty voltage to the plurality of nodes, and the at least one secondary power supply unit does not provide the duty voltage to the plurality of nodes.

In Step S310, a power good signal generated by the at least one primary power supply unit which is started is received. In Step S312, it is determined whether a malfunction occurs at the at least one primary power supply unit which is started according to the power good signal.

When it is determined that a malfunction occurs at the at least one primary power supply unit which is started, Step S314 is performed to determine whether a malfunction occurs at all of the at least one primary power supply unit which is started. When it is determined that a malfunction occurs at all of the at least one primary power supply unit which is started, Step S316 is performed to switch to provide the duty voltage to the plurality of nodes by a corresponding number of power supply units among the at least one secondary power supply unit.

On the other hand, when it is determined that no malfunction occurs at any of the at least one primary power supply unit which is started, Step S318 is performed to determine whether the at least one primary power supply unit which is started where a malfunction occurs is the last one of the at least one primary power supply unit. When it is determined that the at least one primary power supply unit which is started where a malfunction occurs is not the last one of the at least one primary power supply unit, Step S320 is performed to start a corresponding number of the rest of the at least one primary power supply unit.

When it is determined that the at least one primary power supply unit which is started where a malfunction occurs is the last one of the at least one primary power supply unit, Step S322 is performed to switch to provide the duty voltage to the plurality of nodes by the corresponding number of power supply units among the at least one secondary power supply unit. When it is determined in Step S312 that no malfunction occurs at the at least one primary power supply unit which is started, Step S324 is performed to maintain operation of the at least one primary power supply unit which is started.

According to the rack and the power control method thereof of the disclosure, the total power consumption value of the plurality of nodes is calculated according to the power information, the number of power supply units to be turned on is calculated according to the total power consumption value and the maximum supplied power value of a single power supply unit, and then at least one primary power supply unit and at least one secondary power supply unit are started in pairs according to the number of power supply units to be turned on, so that the at least one primary power supply unit provides a duty voltage to the plurality of nodes, and the at least one secondary power supply unit does not provide the duty voltage to the plurality of nodes. Therefore, power saving can be achieved, and the problem that the rack cannot operate when a malfunction occurs at the power supply unit can be solved.

What is claimed is:

1. A power control method of a rack, wherein the rack has a plurality of nodes, the power control method comprising:
   receiving power information of each of the plurality of nodes;
   calculating a total power consumption value of the plurality of nodes according to the power information;
   calculating a number of power supply units to be turned on according to the total power consumption value and a maximum supplied power value of a single power supply unit; and
   starting at least one primary power supply unit and at least one secondary power supply unit in pairs according to the number of power supply units to be turned on, so that the at least one primary power supply unit provides a duty voltage to the plurality of nodes, and the at least one secondary power supply unit does not provide the duty voltage to the plurality of nodes, wherein an input source of the at least one primary power supply unit and an input source of the at least one secondary power supply unit are different.

2. The power control method of the rack according to claim 1, further comprising:
   receiving a power good signal generated by the at least one primary power supply unit which is started;
   determining whether a malfunction occurs at the at least one primary power supply unit which is started according to the power good signal; and
   when it is determined that a malfunction occurs at the at least one primary power supply unit which is started, starting a corresponding number of the rest of the at least one primary power supply unit.

3. The power control method of the rack according to claim 2, before the step of starting the corresponding number of the rest of the at least one primary power supply unit, further comprising:
   determining whether the at least one primary power supply unit which is started to which a malfunction occurs is the last one of the at least one primary power supply unit;
   when it is determined that the at least one primary power supply unit which is started to which a malfunction occurs is not the last one of the at least one primary power supply unit, starting the corresponding number of the rest of the at least one primary power supply unit; and
   when it is determined that the at least one primary power supply unit which is started to which a malfunction occurs is the last one of the at least one primary power supply unit, switching to provide the duty voltage to the plurality of nodes by a corresponding number of power supply units among the at least one secondary power supply unit.

4. The power control method of the rack according to claim 3, before the step of determining whether the at least one primary power supply unit which is started to which a malfunction occurs is the last one of the at least one primary power supply unit, further comprising:
   determining whether a malfunction occurs at all of the at least one primary power supply unit which is started;
   when it is determined that a malfunction occurs at all of the at least one primary power supply unit which is started, switching to provide the duty voltage to the plurality of nodes by the corresponding number of power supply units among the at least one secondary power supply unit; and
   when it is determined that no malfunction occurs at any of the at least one primary power supply unit which is started, performing the step of determining whether the at least one primary power supply unit which is started to which a malfunction occurs is the last one of the at least one primary power supply unit.

5. A rack, comprising:
a plurality of primary power supply units configured to respectively provide a duty voltage;
a plurality of secondary power supply units configured to respectively provide the duty voltage, wherein an input source of the primary power supply units and an input source of the secondary power supply units receive are different;
a plurality of nodes configured to respectively provide power information;
a rack management controller coupled to the plurality of nodes and the rack management controller being configured to receive the power information, calculate a total power consumption value of the plurality of nodes according to the power information, and calculate a number of power supply units to be turned on according to the total power consumption value and a maximum supplied power value of a single power supply unit; and
a control unit coupled to the rack management controller, the primary power supply units and the secondary power supply units, the control unit being configured to receive the number of power supply units to be turned on and generate a plurality of control signals according to the number of power supply units to be turned on, so as to start at least one of the primary power supply units and at least one of the secondary power supply units in pairs, so that the at least one of the primary power supply units provides the duty voltage to the plurality of nodes, and the at least one of the secondary power supply units does not supply the duty voltage to the plurality of nodes.

6. The rack according to claim 5, wherein the control signals comprise a start signal and a power supply signal.

7. The rack according to claim 5, wherein after being started, the at least one of the primary power supply units and the at least one of the secondary power supply units respectively generate and transmit a power good signal to the control unit, the control unit determines whether a malfunction occurs at the at least one of the primary power supply units according to the power good signals, and when determining that a malfunction occurs at the at least one of the primary power supply units, the control unit starts a corresponding number of the rest of the at least one of the primary power supply units.

8. The rack according to claim 7, wherein the control unit further determines whether the at least one of the primary power supply units to which a malfunction occurs is the last one of the primary power supply units, and when determining that the at least one of the primary power supply units to which a malfunction occurs is not the last one of the primary power supply units, the control unit starts the corresponding number of the rest of the at least one of the primary power supply units; and when determining that the at least one of the primary power supply units to which a malfunction occurs is the last one of the primary power supply units, the control unit switches to provide the duty voltage to the plurality of nodes by a corresponding number of the rest of the at least one of the secondary power supply units.

9. The rack according to claim 8, wherein the control unit further determines whether a malfunction occurs at all of the started at least one of the primary power supply units, and when determining that a malfunction occurs at all of the at least one of the primary power supply units which is started, the control unit switches to provide the duty voltage to the plurality of nodes by the corresponding number of the rest of the at least one of the secondary power supply units, and when determining that no malfunction occurs at any of the at least one of the primary power supply units which is started, the control unit determines whether the at least one of the primary power supply units to which a malfunction occurs is the last one of the primary power supply units, so as to determine whether to start the corresponding number of the rest of the at least one of the primary power supply units, or switch to provide the duty voltage to the plurality of nodes by the corresponding number of the rest of the at least one of the secondary power supply units.

10. A rack, comprising:
a rack management controller (RMC) coupled to a plurality of nodes, configured to receive power information therefrom, to calculate a total power consumption value of the plurality of nodes according to the power information, and to calculate a number of power supply units to be turned on according to the total power consumption value and a maximum supplied power value of a single power supply unit;
a plurality of primary power supply units configured to respectively provide a duty voltage; and
a plurality of secondary power supply units configured to respectively provide the duty voltage; and
a control unit coupled to the rack management controller, the primary power supply units and the secondary power supply units, the control unit being configured to receive the number of power supply units to be turned on and generate a plurality of control signals according to the number of power supply units to be turned on;
wherein the plurality of control signals are generated so as to start at least one of the primary power supply units and at least one of the secondary power supply units in pairs, so that the at least one of the primary power supply units provides the duty voltage to the plurality of nodes, and the at least one of the secondary power sum* units does not supply the duty voltage to the plurality of nodes.

11. The rack as recited in claim 10,
wherein an input source of the primary power supply units and an input source of the secondary power supply units receive are different.

12. The rack according to claim 10, wherein the control signals comprise a start signal and a power supply signal.

13. The rack according to claim 10, wherein after being started, the at least one of the primary power supply units and the at least one of the secondary power supply units respectively generate and transmit a power good signal to the control unit.

14. The rack according to claim 13, wherein the control unit determines whether a malfunction occurs at the at least one of the primary power supply units according to the power good signals, and when it is determined that a malfunction occurs at the at least one of the primary power supply units, the control unit starts a corresponding number of the rest of the at least one of the primary power supply units.

15. The rack according to claim 14, wherein the control unit further determines whether the at least one of the primary power supply units to which a malfunction occurs is the last one of the primary power supply units.

16. The rack according to claim 15, wherein when it is determined that the at least one of the primary power supply units to which a malfunction occurs is not the last one of the primary power supply units, the control unit starts the corresponding number of the rest of the at least one of the primary power supply units.

17. The rack according to claim 16, wherein when it is determined that the at least one of the primary power supply units to which a malfunction occurs is the last one of the primary power supply units, the control unit switches to provide the duty voltage to the plurality of nodes by a corresponding number of the rest of the at least one of the secondary power supply units.

18. The rack according to claim 17, wherein the control unit further determines whether a malfunction occurs at all of the started at least one of the primary power supply units, and when it is determined that a malfunction occurs at all of the at least one of the primary power supply units which is started, the control unit switches to provide the duty voltage to the plurality of nodes by the corresponding number of the rest of the at least one of the secondary power supply units.

19. The rack according to claim 18, wherein when it is determined that no malfunction occurs at any of the at least one of the primary power supply units which is started, the control unit determines whether the at least one of the primary power supply units to which a malfunction occurs is the last one of the primary power supply units, so as to determine whether to start the corresponding number of the rest of the at least one of the primary power supply units, or switch to provide the duty voltage to the plurality of nodes by the corresponding number of the rest of the at least one of the secondary power supply units.

\* \* \* \* \*